United States Patent [19]

Rittler

[11] Patent Number: 4,826,628

[45] Date of Patent: *May 2, 1989

[54] VAPOR/THERMAL METHOD OF DELAMINATING AND STABILIZING A PHYLLOSILATE AND PRODUCT

[75] Inventor: Hermann L. Rittler, Corning, N.Y.

[73] Assignee: Corning Glass Works, Corning, N.Y.

[*] Notice: The portion of the term of this patent subsequent to Sep. 20, 2005 has been disclaimed.

[21] Appl. No.: 91,444

[22] Filed: Aug. 31, 1987

[51] Int. Cl.⁴ .................. C04B 33/00; C04B 33/02
[52] U.S. Cl. ........................ 252/378 R; 501/145; 501/150
[58] Field of Search ............. 501/145, 150; 428/363, 428/404, 454; 252/378 R; 106/DIG. 3

[56] References Cited

U.S. PATENT DOCUMENTS

| | | | |
|---|---|---|---|
| 1,963,275 | 6/1934 | Labus | 252/378 R |
| 4,690,868 | 9/1987 | Rice | 428/404 |

Primary Examiner—William R. Dixon, Jr.
Assistant Examiner—David M. Brunsman
Attorney, Agent, or Firm—Clinton S. Janes, Jr.

[57] ABSTRACT

A method of delaminating a phyllosilicate is disclosed wherein the phyllosilicate is heated in the presence of a reactive vapor phase, preferably a hydrogen-containing atmosphere. The delaminated phyllosilicate is less than 1000Å thick, and is stabilized against moisture pickup. The formation of either a layer of a transition metal, or an organic reactive site, on the phyllosilicate surface is also disclosed.

14 Claims, 4 Drawing Sheets

VAPOR/THERMAL METHOD OF DELAMINATING AND STABILIZING A PHYLLOSILATE AND PRODUCT

RELATED APPLICATION

An application filed of even date herewith in my name, now U.S. Pat. No. 4,772,577 and entitled "Metal Coated Phyllosilicate and Method," describes and claims a delaminated phyllosilicate particle having a coating of metal on its surface. Also disclosed and claimed are methods of producing such metal-coated particles, and a ceramic-metal composite composed of such particles compressed into a solid body.

INTRODUCTION

This invention is concerned with providing a delaminated phyllosilicate that is hydrolytically and hygroscopically stabilized, and with a method of producing such material. Phyllosilicates are also known as hydrated sheet, or lattice layered, silicates.

The invention comprehends the entire genus of hydrated, or hydratable, phyllosilicates. It is especially concerned with the three layer micas, whether of natural or synthetic origin, although not so limited. These silicate minerals include vermiculite, beidellite, nontronite, volchonskoite, saponite, stevensite, sauconite, pimelite, bentonite, montmorillonite, hectorite, the smectites, attapulgite, sepiolite, phlogopite, and biopyribole. The most widely known and extensively studied of these minerals, vermiculite, is of particular interest.

The silicate layer units in these minerals have a thickness of about 10 Angstrom (Å) units, with the main elemental constituents being Mg, Al, Si, and O. These layers are separated by an interlayer composed of water molecules associated with cations, such as $Mg^{++}$, $Ca^{++}$, $Na^+$, $K^+$, and $H^+$. Before utilizing these minerals, it is frequently desirable to delaminate the particles, that is, separate the crystals at the interlayer to form smaller particles.

It is conventional practice to delaminate the layered silicates by heating to an elevated temperature. This causes the water-containing interlayer to expand and pop open. It has also been proposed to expand vermiculite particles by refluxing in an aqueous solution of a salt such as lithium chloride. Subsequent application of a shearing force causes the crystals to separate at the interlayer and form an aqueous gel.

My U.S. Pat. No. 4,676,929 describes a method of delamination wherein a hydrated phyllosilicate is dispersed in an expanding agent, which may be a primary aminocarboxy acid, or lysine orotate, or glycylglycine. When accompanied by a shearing force, the expanding agent is effective, at ambient temperature, to separate the silicate layer units of the phyllosilicate crystal in a matter of minutes, and form a gel.

RELATED LITERATURE

In addition to the patent just mentioned, and literature cited therein, reference is also made to my copending applications, Ser. No. 861,939 and Ser. No. 862,256, both filed May 12, 1986. The former describes subjecting a phyllosilicate to an ion exchange treatment before reacting it with an expanding agent, as in U.S. Pat. No. 4,676,929. The latter describes subjecting a phyllosilicate to an ion exchange treatment, plus a thermal treatment, to develop a new crystal phase which forms a solid solution.

Attention is also directed to the following U.S. patents:

U.S. Pat. No. 4,521,182 (Collins) discloses heating a particulate material, such as vermiculite, perlite, or clay, by directing a flame downwardly within a vertical furnace, introducing the particulate material radially around the flame, and directing the material within the flame as it passes downwardly.

U.S. Pat. No. 4,539,046 (McAloon) discloses producing vermiculite products that are stable in water by incorporating a source of ammonia in an aqueous suspension of vermiculite lamellae, shaping the suspension, and removing water from the suspension by heating the shaped suspension at a temperature above 100° C. The ammonia contacts the suspension as the suspension is dried.

PURPOSES OF THE INVENTION

Phyllosilicates, as heretofore delaminated, have proven effective for some purposes. However, in other instances, such as electrical applications, the physical properties of the material have been inadequate. It is a basic purpose of the invention to provide delaminated phyllosilicates having improved physical properties.

Another purpose is to provide a novel delamination method that provides such improved properties.

A particularly troublesome problem, heretofore encountered with delaminated phyllosilicates, derives from their hygroscopic nature. A phyllosilicate is substantially dehydrated during delamination by heat treatment. However, there is a tendency to rehydrate once the material is cooled and allowed to stand in air. A particular purpose of the invention is to provide a delaminated phyllosilicate that is stabilized against rehydration.

A further purpose is to provide a method of delamination capable of producing very finely delaminated particles.

A still further purpose is to provide a delaminated product having reactive organic sites on its surfaces. Such sites may permit polymerization and cross-linking to provide a uniformly chemically-bonded, ceramic-organic composite.

Another purpose is to provide a delaminated phyllosilicate wherein the delaminated particles have a metallic film, or layer, on the particle surfaces.

SUMMARY OF THE INVENTION

In furtherance of these purposes, and others that will become apparent, one aspect of the invention is a method of producing a delaminated phyllosilicate that is hydrolytically and hygroscopically stabilized by heating the phyllosilicate in contact with a reactive, non-oxidizing vapor phase, for a time and at a temperature sufficient to cause delamination of the material. Preferably, the vapor phase is hydrogen, in an atmosphere of forming gas.

In one particular embodiment of the invention, the phyllosilicate may be subjected to an ion exchange with a metal ion prior to heat treatment in the reactive vapor phase. In that case, vapor phase delaminated phyllosilicate particles may have a metal film or coating formed on their surfaces.

In another embodiment, the phyllosilicate is heated in a selected vapor phase to produce controlled organic reactive sites, such as attached radicals, pendent groups, or monomers, chemically bonded to the phyllosilicate surface.

The invention further resides in delaminated phyllosilicate particles that are less than 1000 Å in thickness, and that are hydrolytically and hygroscopically stabilized. In one specific embodiment, the particles have controlled organic reactive sites, such as attached radicals, pendent groups, or monomers, chemically bonded to their surfaces. In another embodiment, the particles have a metal film formed in situ on their surfaces.

GENERAL DESCRIPTION OF THE INVENTION

The basic inventive method derives from my discovery that the undesirable tendency of a thermally delaminated phyllosilicate to rehydrate can be greatly minimized, and a substantially stable material provided. I have found that, if the delaminating heat treatment is conducted in a controlled non-oxidizing atmosphere, this desirable effect can be achieved. The atmosphere may be neutral or reducing, but must contain, or be constituted by, a reactive vapor phase which may be $H_2$, $CO_2$, $CO$, $NH_3$, $CH_4$, or $C_2H_6$, among others.

The delaminating heat treatment, in a controlled atmosphere, is a significant change from previously practiced thermal delamination. Under some circumstances, it may be effective at lower temperatures than heretofore considered feasible. Also, as explained later, a higher degree of delamination, even down to unit cell size, may be achieved.

Thus, a phyllosilicate, to be delaminated, may be heated to a temperature of at least about 400° C., but not over about 1000° C., for a period of time not exceeding about one hour. Longer times and/or higher temperatures are generally unnecessary, but may be useful in development of other properties. They tend to produce physical changes in the material, such as phase transitions, electronic and polychromatic properties, or reduced surface area. For most purposes, optimum delamination, with a minimum of side effects, such as reduced surface area, is achieved with heat treatment temperatures on the order of 800° C.

The heat treatment may be conducted in any chamber adapted to maintenance of a controlled atmosphere. This may be either a batch type unit, such as a batch kiln or closed vessel, or a continuous unit, such as a tunnel kiln.

The unique feature is that the heat treatment is conducted in a neutral or a non-oxidizing atmosphere containing, or composed of, a reactive vapor phase. Where the sole concern is stabilization, forming gas or anhydrous ammonia is usually the preferred atmosphere. While hydrogen might be used alone, forming gas is obviously much less expensive and safer to use. Vapor phase materials, other than hydrogen, may be employed, including carbon monoxide, carbon dioxide, methane, ethane, propane, methanol, and anhydrous ammonia. For special effects, especially formation of reactive organic sites on the delaminated surfaces, the vapor phase material may be anhydrous ammonia, or a gaseous organic material, such as, ethylene oxide, methane, propane, or ethane.

It is generally accepted that phyllosilicates, such as vermiculite, have an unbalanced negative ionic charge. It is my belief this is associated with —OH ions on the phyllosilicate surface, as well as with defects in the crystal structure. I further believe that the effect of the vapor phase/thermal treatment of my invention is to remove such surface ions, and thereby satisfy the electronic charge. As a result, the neutral surface is stabilized, or rendered functional, and resists moisture pickup after cooling.

My concept of the reactions occurring in the present method may be depicted as follows:

1. $H_2O$ (molecular) + heat → $H_2O$ + partial delamination

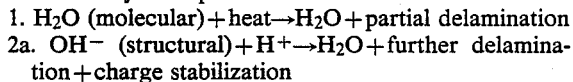

2a. $OH^-$ (structural) + $H^+$ → $H_2O$ + further delamination + charge stabilization or 2b. $2OH^-$ (structural) + $2CO$ → $2COOH$ → $2CO + H_2O + \frac{1}{2}O_2$

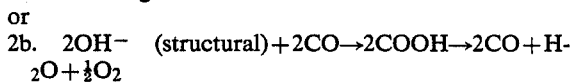

I believe the presence of the reactive vapor phase not only exerts a stabilizing influence, but tends to cause further delamination of the phyllosilicate. This is shown by the fact that the phyllosilicate may be so strongly delaminated that it is not visible to standard X-ray diffraction analyses. This means that delamination to at least less than a hundred unit cells (1000 Å) has occurred.

Electron microscope studies confirm that delamination to less than 1000 Å has occurred. They further show that the particles are usually much smaller, even down to unit cell size in part. Thus, delaminated particles produced by vapor phase/thermal treatment are smaller than those obtained by prior techniques.

I believe this further delamination derives from removal of structural hydroxyl ion ($OH^-$) as illustrated in equation 2a or 2b above. This is also thought to be a major factor in thermal delamination occurring at lower temperatures than previously deemed necessary.

However, if the phyllosilicate particles are compressed to form a body, such as a bar or disc, they tend to orient in layers or sheets resembling the parent sheet structure. Such pressed bodies tend to show an apparent, or functional, aspect ratio of at least 100:1.

I have further found that phyllosilicate particles with metallic coatings can be produced by providing the desired metal in, or on the surface of, the particle prior to the thermal/vapor phase treatment. The phyllosilicate may be heated in the presence of a metal compound to effect anion exchange between the metal and ions from the phyllosilicate, such as $Na^+$, $K^+$, or $Mg^{++}$. Alternatively, the metal compound may be dried on the surface of the phyllosilicate prior to the vapor phase treatment.

The ion exchange may also be effected by intimately mixing the phyllosilicate with a solution of a salt of the desired metal. For most purposes an aqueous solution is most convenient and economical to use. However, if desired, a non-aqueous solution may be employed, and may be necessary in some instances. Thus, a non-aqueous solution, such as alcohol, of aluminum chloride must be used in order to obtain an aluminum, rather than aluminum oxide, coating.

X-ray diffraction (XRD) analyses show that ion-exchanged phyllosilicates delaminate at substantially lower temperatures than corresponding materials that have not been ion exchanged. This is especially true when aqueous solutions of tin chloride ($SnCl_2$), antimony chloride ($SbCl_3$), lead acetate $PbC_2H_3O_2$, or copper chloride ($CuCl_2$) are employed to carry out the ion exchange. For example, the presence of metallic tin was observed by both XRD and DTA analyses on a sample delaminated by heat treatment at 400° C. in a forming gas atmosphere.

In many instances, only metals or metal oxides are revealed in an X-ray trace, even though chemical analyses have shown the metal component to be less than 20% by weight. This further verifies that the phyllosilicate particles are less than 1000 Å in cross-section.

Infra-red analyses have shown that organic monomers can be chemically bonded to the phyllosilicate platelet surfaces by proper selection of the vapor phase, as well as temperature. For example, with a methane vapor phase, the presence of methyl ions has been observed. Likewise, with a $CO_2$ phase, a carbonate phase has been observed.

There is a further reason to believe that a phyllosilicate surface, subjected to a reactive vapor phase, has been chemically functionalized. In many instances, surface area measurements, utilizing the $N_2$-BET technique, are substantially lower than would normally be expected. This is believed to be due to interference by chemical groups during the measurements.

Such reactive site formation does not occur under all conditions. In particular, lower temperatures on the order of 400°–500° C. appear favorable. Frequently, it is desirable to delaminate at a higher temperature. In that event, the delaminated material may be cooled subsequently to a predetermined intermediate temperature, and the requisite vapor phase introduced while the material is held at such intermediate temperature.

SPECIFIC DESCRIPTION

By way of illustrating the improved stability achieved by the present inventive method, several vermiculite samples from different sources, as well as various other phyllosilicates, were subjected to comparative tests. Each sample was divided into four equal portions with each portion being heated at 800° C. for one hour, but in a different atmosphere. Thus, one sample was heated in air; a second in a carbon dioxide atmosphere; a third in a forming gas (92% $N_2$ - 8% $H_2$) atmosphere; and the fourth in a methane atmosphere.

Subsequent to the heat treatment, each sample was observed to be delaminated.

Each sample was weighed before and after its heat treatment to compare the loss on ignition (LOI). Then, the samples were allowed to stand in air at a humidity level of about 40% and a temperature of 25° C. for 144 hours to determine the per cent weight gain.

The materials tested were:

| Material | Source |
|---|---|
| 1. Vermiculite | Eucatex brand |
| 2. Vermiculite | South Africa |
| 3. Vermiculite | North Carolina |
| 4. Vermiculite | Minebra brand |
| 5. Sepiolite | |
| 6. Bentonite | |
| 7. Kaolin | |
| 8. Talc | |

TABLE I tabulates the LOI values, and the % Wt. Gain values, observed for each material, and each of the four treating atmospheres. The materials are designated by number as identified above.

TABLE I

| Sample | LOI (%) | | | | Wt. Gain (%) | | | |
|---|---|---|---|---|---|---|---|---|
| | Air | $CO_2$ | $N_2/H_2$ | $CH_4$ | Air | $CO_2$ | $N_2/H_2$ | $CH_4$ |
| 1. | 16.3 | 16.6 | 17.2 | 15.9 | 0.27 | 0.14 | 0.009 | 0.05 |
| 2. | 9.3 | 12.4 | 12.7 | 9.9 | 0.56 | 0.14 | 0.03 | — |
| 3. | 9.5 | 12.4 | 14.2 | 11.6 | 0.23 | 0.06 | 0.09 | — |
| 4. | 9.9 | 10.2 | 10.9 | — | 0.22 | 0.05 | 0.05 | 0.04 |
| 5. | 15.7 | 16.6 | 16.9 | 16.9 | 1.33 | 0.17 | 0.03 | — |

TABLE I-continued

| Sample | LOI (%) | | | | Wt. Gain (%) | | | |
|---|---|---|---|---|---|---|---|---|
| | Air | $CO_2$ | $N_2/H_2$ | $CH_4$ | Air | $CO_2$ | $N_2/H_2$ | $CH_4$ |
| 6. | 16.8 | 17.1 | 17.1 | — | 0.65 | 0.09 | 0.21 | 0.07 |
| 7. | — | — | — | — | 0.11 | 0.08 | 0.11 | 0.26 |
| 8. | 1.3 | 5.2 | 5.3 | 5.4 | 0.12 | 0.07 | 0.11 | 0.07 |

It is evident that the firing in a reactive vapor phase is equally, or more, effective in permitting volatile loss from the materials. However, the weight gain on standing is substantially less for the non-oxidizing vapor phase samples. The kaolin and talc samples are included as illustrative of natural materials frequently used as stable fillers in paints, plastics, and gels.

The effectiveness of the invention was further illustrated by comparing the volumes of four different gases evolved from treated and untreated phyllosilicate materials. Samples of talc and vermiculite were each divided into two portions. One portion was retained in the "as received" condition, while the other was heated in a forming gas atmosphere overnite at 800° C.

The treated samples were cooled, and all samples were exposed to ambient atmosphere. Each of the four portions was then outgassed under vacuum in a mass spectrometer at several successively increased temperatures. The amount of gas evolved from a sample was recorded at each temperature in terms of four different gases evolved. The measured values were normalized to microliters/gram for comparison.

TABLE II sets forth the normalized values at each temperature for each of the four samples measured.

TABLE II

| Temp. (°C.) | $H_2$ | $H_2O$ | $N_2/CO$ | $CO_2$ |
|---|---|---|---|---|
| Talc (as received) | | | | |
| 100 | 12 | 103 | 3 | 8 |
| 200 | 24 | 190 | 21 | 63 |
| 300 | 47 | 233 | 69 | 113 |
| 400 | 227 | 292 | 132 | 180 |
| 600 | 451 | 1496 | 165 | 340 |
| 800 | 1622 | 7874 | 347 | 128 |
| 1000 | 2076 | 2771 | 740 | 94 |
| Total | 4459 | 12,959 | 1477 | 926 |
| Talc (treated) | | | | |
| 100 | 2 | 2 | 1 | 1 |
| 200 | 3 | 5 | 5 | 5 |
| 300 | 3 | 8 | 14 | 17 |
| 400 | 8 | 13 | 14 | 10 |
| 600 | 28 | 75 | 26 | 15 |
| 800 | 60 | 336 | 129 | 70 |
| 1000 | 79 | 326 | 224 | 96 |
| Total | 183 | 765 | 413 | 214 |
| Vermiculite (as received) | | | | |
| 100 | 276 | 3160 | 40 | 50 |
| 200 | 178 | 2139 | 33 | 40 |
| 300 | 152 | 1908 | 42 | 54 |
| 400 | 173 | 1503 | 67 | 113 |
| 600 | 457 | 3950 | 388 | 1441 |
| 800 | 702 | 5067 | 342 | 232 |
| 1000 | 355 | 1272 | 371 | 384 |
| Total | 2293 | 18,999 | 1283 | 2314 |
| Vermiculite (treated) | | | | |
| 100 | 1 | 8 | 1 | 3 |
| 200 | 2 | 18 | 2 | 7 |
| 300 | 5 | 21 | 9 | 18 |
| 400 | 13 | 36 | 11 | 18 |
| 600 | 43 | 233 | 13 | 9 |
| 800 | 349 | 1137 | 62 | 22 |
| 1000 | 672 | 1851 | 97 | 45 |
| Total | 1085 | 3304 | 195 | 122 |

The stabilizing effect is evident. Outgassing up to about 400° C. is considered to be primarily from the material surface. Above that temperature, it is thought that internal, or structural, outgassing predominates.

Electron diffraction studies were made on both vermiculite and talc samples that had been thermally treated at 800° C. in a forming gas atmosphere. These were carried out since routine X-ray diffraction studies did not show a 10 Å peak characteristic of the untreated materials. The electron diffraction values observed were very close to standard values for both materials as reported on JCPDS standard cards. However, lines below the 004 line, that is 001 and 002 lines, did not appear. This indicated that the materials were finely subdivided to less than a ten unit cell (100 Å) thickness, but that the original talc and vermiculite structures were retained.

The greater degree of delamination achieved in the presence of a reactive vapor phase is further illustrated by transmission electron micrographs (TEMs) taken of two talc samples and two vermiculite samples. One talc sample was heated at 800° C. in air for one hour. The other talc sample was heated in a forming gas atmosphere with the same time-temperature cycle. Likewise, one vermiculite sample was heated at 800° C. in air; the other in a forming gas atmosphere.

DESCRIPTION OF THE DRAWING

FIG. I is a TEM of the talc sample thermally treated in a forming gas atmosphere. The relative transparency of the particles indicated a layer, or C-axis, thickness of less than 1000 Å. Magnification was 40,000×.

FIG. II is a TEM of the talc sample thermally treated in an air atmosphere. The total opacity indicates a much greater particle thickness than that of the FIG. I sample. Magnification was 20,000×.

Figure 1:
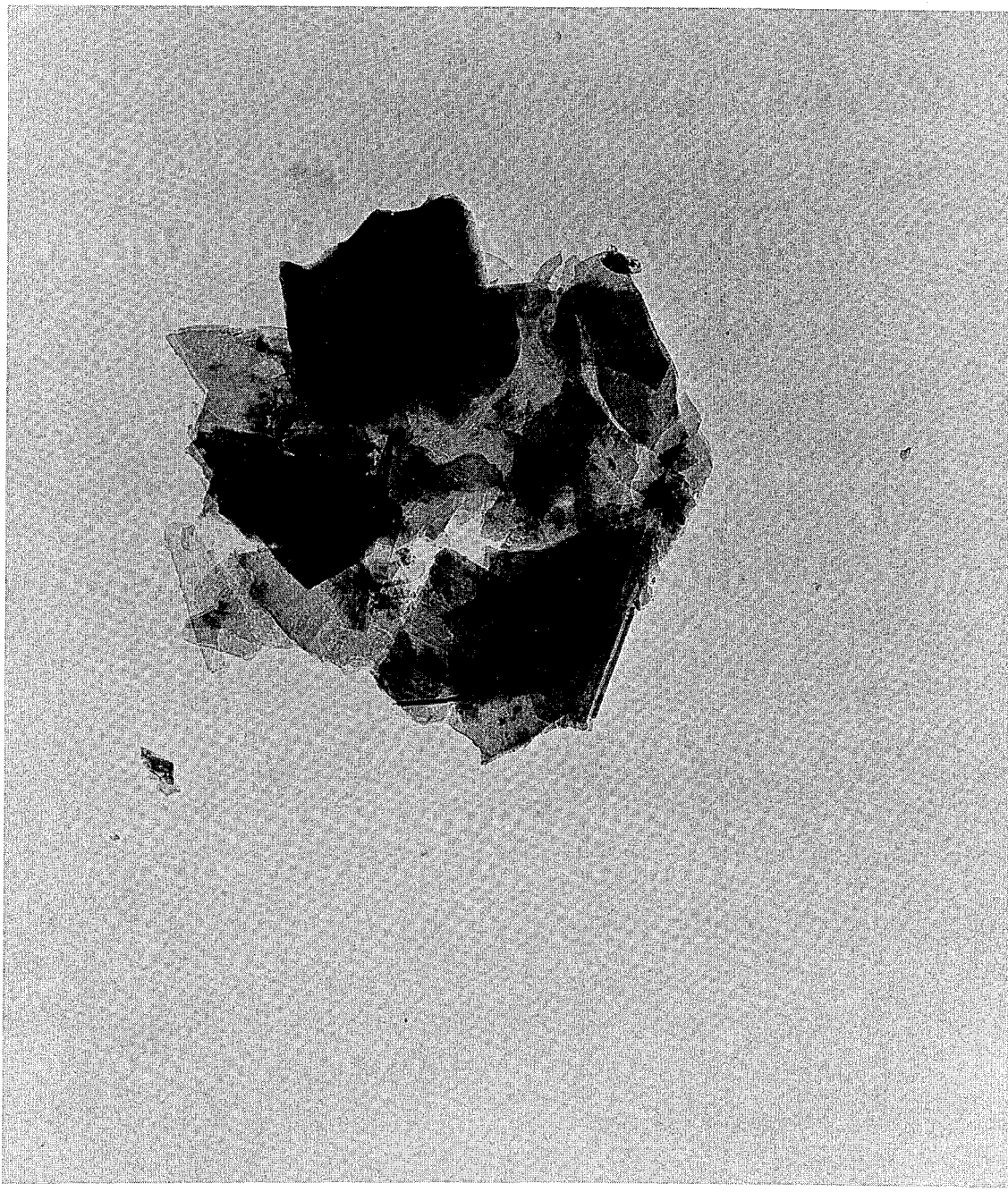
Figure 2:
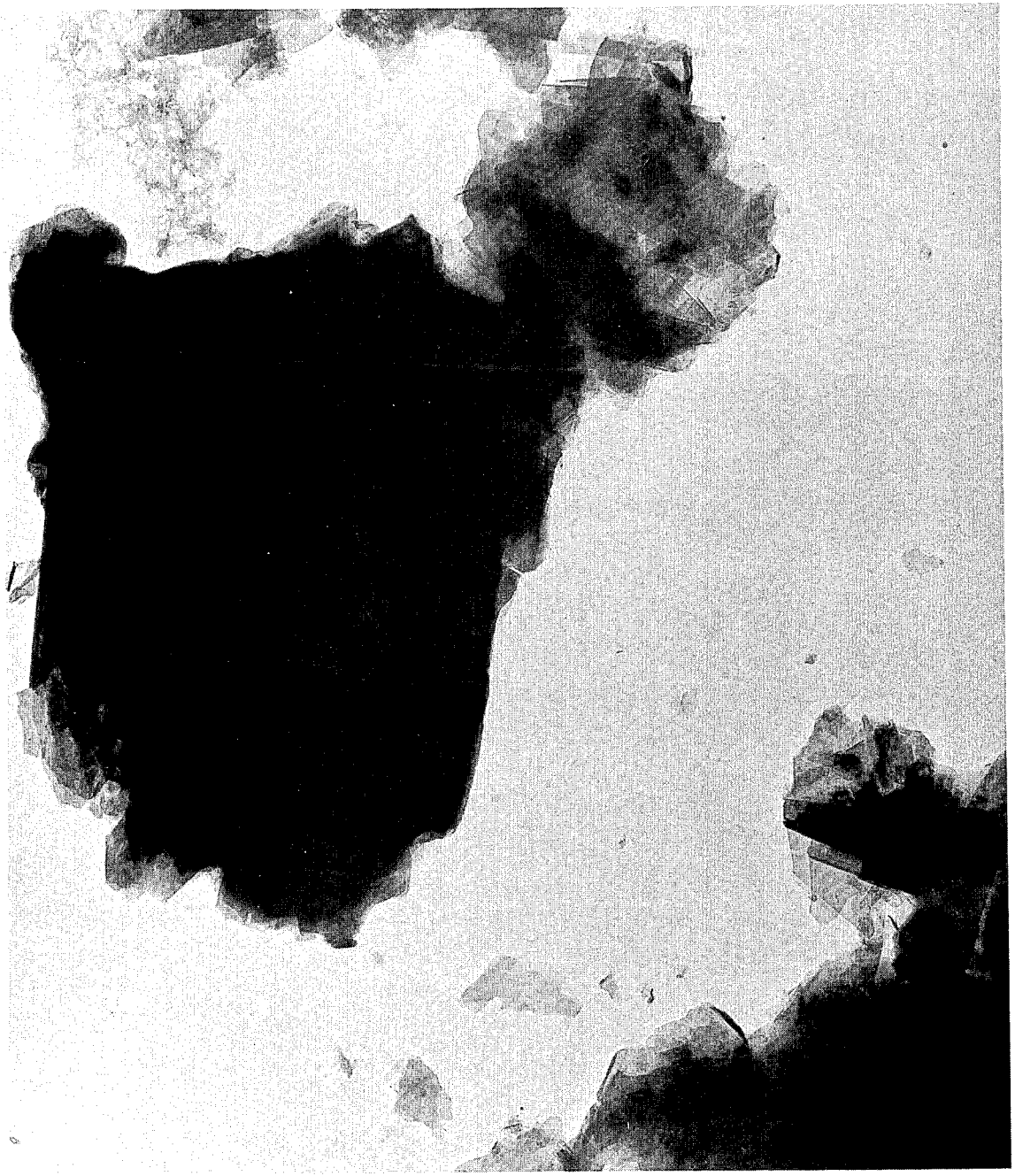
Figure 3:
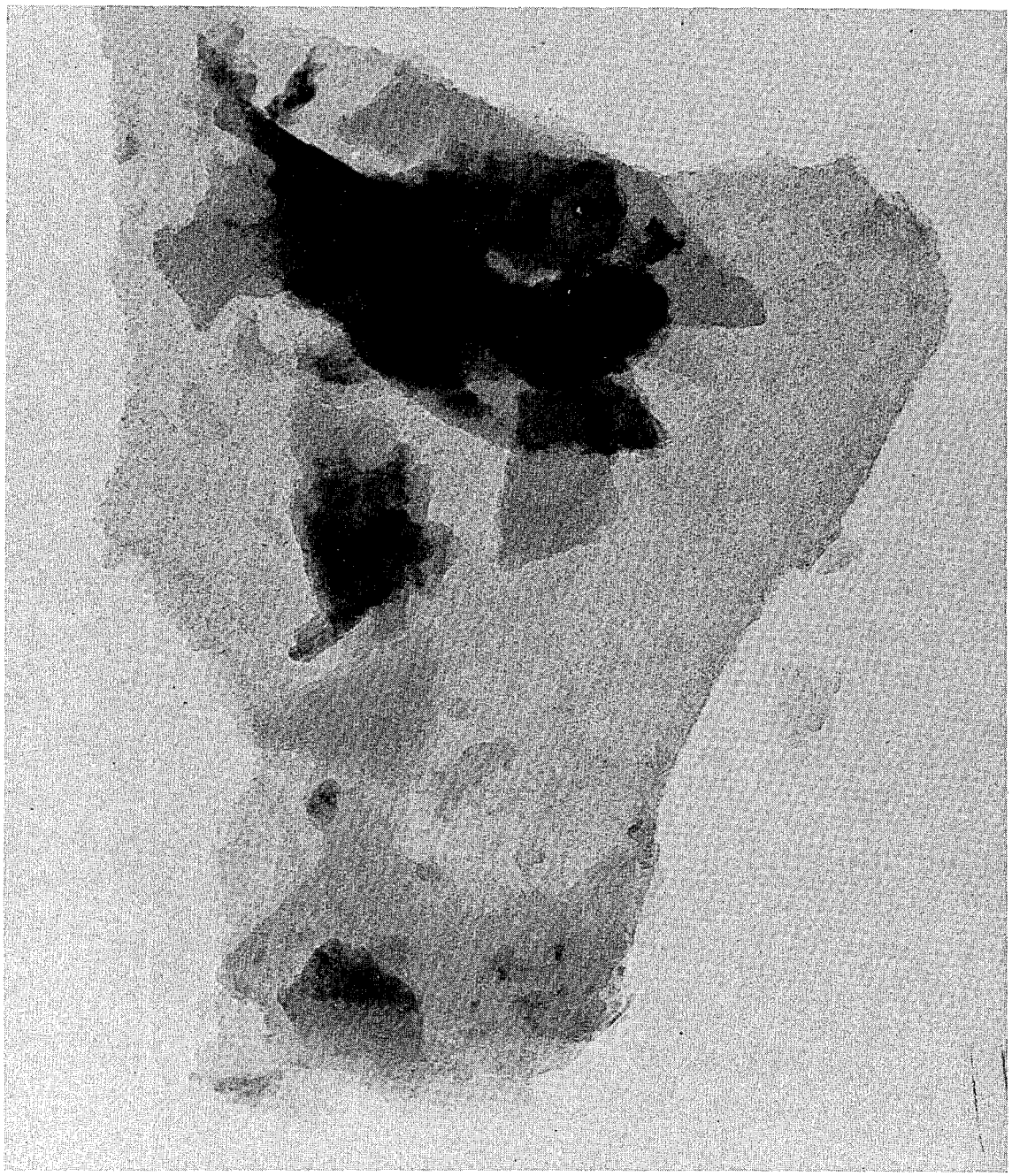
Figure 4:

FIG. III is a TEM of the vermiculite sample thermally treated in a forming gas atmosphere. The magnification was 253,000×, the micrograph transparency indicates the thickness less than 1000 Å, and the increased magnification shows the uneven particle surface. The latter is thought to arise from gas evolution from within the particle.

FIG. IV is a TEM of the vermiculite sample thermally treated in an air atmosphere. Magnification was 40,000×. As in the talc sample of FIG. II, the opacity indicates a much greater particle thickness than the forming gas treated sample of FIG. III.

I claim:

1. A method of producing a delaminated phyllosilicate that is hydrolytically and hygroscopically stabilized by heating a phyllosilicate in contact with a reactive nonoxidizing vapor phase for a time and at a temperature sufficient to delaminate the phyllosilicate.

2. A method in accordance with claim 1 wherein the time of treatment does not exceed about one hour.

3. A method in accordance with claim 1 wherein the temperature at which the material is heated is in the range of about 400° C. to about 1000° C.

4. A method in accordance with claim 1 wherein the reactive vapor phase is hydrogen.

5. A method in accordance with claim 4 wherein the phyllosilicate is delaminated in a forming gas atmosphere.

6. A method in accordance with claim 1 wherein the phyllosilicate is vermiculite.

7. A method in accordance with claim 1 wherein the phyllosilicate is talc.

8. A method in accordance with claim 1 wherein the delaminated phyllosilicate is exposed to a selected vapor phase at a temperature such that a controlled organic reactive site is chemically bonded to the phyllosilicate surface.

9. A method in accordance with claim 8 wherein the phyllosilicate is delaminated at a temperature above that at which the reactive site forms, and the delaminated phyllosilicate is cooled to an intermediate temperature for formation of the reactive site.

10. A method in accordance with claim 8 wherein the reactive site is an attached radical, a pendent group, or a monomer.

11. A method in accordance with claim 8 wherein the atmosphere is carbon monoxide, and an organic monomer is formed on the surface.

12. A delaminated phyllosilicate composed of particles less than 1000 Å in thickness, and being hydrolytically and hygroscopically stabilized.

13. A delaminated phyllosilicate in accordance with claim 12 wherein the phyllosilicate surface has a reactive organic site attached thereto.

14. A compressed body composed of delaminated phyllosilicate particles that are less than 1000 Å thick, are hydrolytically and hygroscopically stabilized, and have a functional aspect ratio of at least 100:1.

* * * * *